United States Patent [19]
Uchizono

[11] Patent Number: 5,200,839
[45] Date of Patent: Apr. 6, 1993

[54] IMAGE PROCESSING APPARATUS

[75] Inventor: Takeharu Uchizono, Yokohama, Japan

[73] Assignee: Canon Kabushiki Kaisha, Tokyo, Japan

[21] Appl. No.: 900,762

[22] Filed: Jun. 19, 1992

Related U.S. Application Data

[63] Continuation of Ser. No. 749,952, Aug. 26, 1991, abandoned.

[30] Foreign Application Priority Data

Aug. 31, 1990 [JP] Japan .................................. 2-230263
Aug. 31, 1990 [JP] Japan .................................. 2-230264

[51] Int. Cl.$^5$ .............................................. H04N 1/40
[52] U.S. Cl. .................................... 358/448; 358/429
[58] Field of Search ...................... 358/448, 456–459, 358/466, 428–430

[56] References Cited

U.S. PATENT DOCUMENTS

| | | | |
|---|---|---|---|
| 4,614,977 | 9/1986 | Kawahara et al. | 358/428 |
| 4,768,082 | 8/1988 | Hiratsuka et al. | 358/429 |
| 4,786,975 | 11/1988 | Postl | 358/429 |
| 4,894,727 | 1/1990 | Sasaki | 358/429 |
| 4,922,273 | 5/1990 | Yonekawa et al. | 358/429 |
| 4,977,464 | 12/1990 | Ikuta | 358/458 |

FOREIGN PATENT DOCUMENTS 57-104369 6/1982 Japan .

OTHER PUBLICATIONS

R. Floyd and L. Steinberg, "An Adaptive Algorithm for Spatial Grey Scale," SID 75 Digest, pp. 36–37.

*Primary Examiner*—Stephen Brinich
*Attorney, Agent, or Firm*—Fitzpatrick, Cella, Harper & Scinto

[57] ABSTRACT

In an image processing apparatus which performs pseudo-halftone processing of multivalue image data, the multivalue image data are subjected to partial removal processing in accordance with an assigned reduction ratio, and the resultant multivalue data are then subjected to binary-coding processing. In partial removal processing, data of a removed picture element are reflected upon data of adjacent picture elements. Binary-coding processing is performed by referring to binary data of a predetermined region subjected to binary-coding processing. It is thereby possible to obtain an image having excellent gradation and resolution in a short time with a simple configuration of hardware, and to obtain an image not having deterioration of picture quality even in image reduction.

24 Claims, 12 Drawing Sheets

FIG. 1 (1)
MULTIVALUE IMAGE

| f(i-2,j-2) | f(i-1,j-2) | f(i,j-2) | f(i+1,j-2) | f(i+1,j-2) |
|---|---|---|---|---|
| f(i-2,j-1) | f(i-1,j-1) | f(i,j-1) | f(i+1,j-1) | f(i+2,j-1) |
| f(i-2,j) | f(i-1,j) | f(i,j) | f(i+1,j) | f(i+2,j) |

FIG. 1 (2)
BINARY-CODED IMAGE

| B(i-2,j-2) | B(i-1,j-2) | B(i,j-2) | B(i+1,j-2) | B(i+2,j-2) |
|---|---|---|---|---|
| B(i-2,j-1) | B(i-1,j-1) | B(i,j-2) | B(i+1,j-1) | B(i+2,j-1) |
| B(i-2,j) | B(i-1,j) | B(i,j) | | |

FIG. 1 (3)
WEIGHTING MASK

| R(-2,-2) | R(-1,-2) | R(0,-2) | R(+1,-2) | R(+2,-2) |
|---|---|---|---|---|
| R(-2,-1) | R(-1,-1) | R(0,-1) | R(+1,-1) | R(+2,-1) |
| R(-2,0) | R(-1,0) | R(0,0) | R(+1,0) | R(+2,0) |

$R(0,0) = R(+1,0) = R(+2,0) = 0$

WHEN REDUCTION RATIO IS
MORE THAN 50%

PICTURE ELEMENT
TO BE REMOVED $$C = \frac{A + B}{2}$$

WHEN REDUCTION RATIO IS
LESS THAN 50%

PICTURE ELEMENT ①

WHEN REDUCTION RATIO IS MORE THAN 50%

WHEN REDUCTION RATIO IS LESS THAN 50%

IMAGE PROCESSING APPARATUS

This application is a continuation of application Ser. No. 07/749,952 filed Aug. 26, 1991 now abandoned.

BACKGROUND OF THE INVENTION

1. Field of the Invention

This invention relates to an image processing apparatus which performs pseudo-halftone processing of multivalue image data.

2. Description of the Related Art

An error diffusion method and an average density approximation method have been proposed as pseudo-halftone processing methods in an image processing apparatus, such as a facsimile apparatus, a digital copier or the like.

In the error diffusion method, as disclosed in "An Adaptive Algorithm for Spatial Gray Scale", SID 75 Digest, pp. 36–37, by R. Floyd and L. Steinberg, multivalue image data of a target picture element are binary-coded (converted into either the densest level or the lightest level), predetermined weighting processing is performed on the binarization error (the difference between the binary-coded level and the multivalue image data before the binary-coding processing), and the resultant weighted data are added to the data of picture elements near the target picture element.

In the average density approximation method, as described in Japanese Patent Application Public Disclosure (Kokai) No. 57-104369 (1982), each weighted average value of a target picture element and neighboring picture elements when the target picture element is binary-coded to black or white is obtained using already binary-coded data near the target picture element, and image data of the target picture element are binary-coded using the average of the two average values as the binarization threshold value.

Since the above-described error diffusion method is a method of correcting an error between input image data and output image data, it is possible to preserve the densities of the input image in the output image, and to provide an image having excellent resolution and gradation.

In the error diffusion method, however, a large amount of two-dimensional calculation must be performed when correcting for (distributing) the errors between input image data and output image data. Hence, this method has the disadvantage that the configuration of hardware becomes very complicated due to the large amount of processing required.

Since the average density approximation method performs calculation using binary data after binary-coding processing, it is possible to simplify the configuration of hardware, and to realize high-speed processing due to the extremely small amount of needed processing.

In the average density approximation method, however, binary-coding processing is performed while approximating a target picture element to an average value of a region including the target picture element. Hence, this method has the disadvantages that the number of gradation is limited, and that a peculiar low-frequency texture is produced for an image having a gentle density variation, degrading picture quality.

In order to remove the above-described disadvantages, the assignee of the present application has filed patent applications on inventions for correcting an error produced by binary-coding processing by the average density approximation method in CFO 6620US (application No. 476,766, filed Feb. 8, 1990), CFO 6621US (application No. 476,618, filed Feb. 7, 1990), CFO 6773US (application No. 514,616, filed Apr. 26, 1990), CFO 6774US (application No. 515,222, filed Apr. 27, 1990), CFO 7074US (application No. 587,217, filed Sep. 24, 1990), and CFO 7075US (application No. 587,858, filed Sep. 25, 1990).

In general, in a conventional method, when it is intended to obtain a reduced binary-coded image, some of the binary-coded data after binary-coding processing are removed, or a reading system controls data to be input in advance. Hence, the conventional method has the disadvantage that the hardware becomes complicated.

Furthermore, the conventional method has the disadvantages that fine lines disappear and that gradation deteriorates when reduction is performed by simple removal of some data.

Particularly, in the above-described average density approximation method, binary data after binary-coding processing are used also for the subsequent binary-coding processing. Hence, this method has the disadvantage that simple removal of some data in reduction influences even the subsequent binary-coding processing.

The method also has the disadvantages that when reduction is performed by simple removal of some data, fine lines might disappear and gradation might deteriorate. Such phenomena appear more pronouncedly as the reduction ratio is smaller.

SUMMARY OF THE INVENTION

The present invention has been made in order to solve the above-described problems.

It is an object of the present invention to provide an image processing apparatus which can obtain an image having excellent gradation and resolution in a short time with a simple configuration of hardware, and which can obtain an image not having deterioration of picture quality even in reduction.

It is a further object of the present invention to provide an image processing apparatus which can prevent deterioration of picture quality when removal processing of some data is performed, by reflecting multivalue data of a removed picture element upon multivalue data of adjacent picture elements.

It is a still further object of the present invention to provide an image processing apparatus which can obtain an image having high picture quality with a simple configuration by quantizing multivalue data subjected to partial removal processing based on an average density obtained using quantized data.

It is still another object of the present invention to provide an image processing apparatus wherein partial removal processing is varied between edge portions and non-edge portions of an image.

It is still a further object of the present invention to provide an image processing apparatus wherein partial removal processing is varied in accordance with a reduction ratio of an image.

The foregoing and other objects and features of the present invention will become more apparent from the following detailed description of the preferred embodiments taken in connection with the accompanying drawings.

BRIEF DESCRIPTION OF THE DRAWINGS

FIGS. 1(1), 1(2) and 1(3) illustrate multivalue-image data, binary-coded-image data, and weighting-mask data for picture elements, respectively;

DETAILED DESCRIPTION OF THE PREFERRED EMBODIMENTS

The preferred embodiments of the present invention will now be explained in detail with reference to the drawings.

First Embodiment

The principle of the present method will be first explained.

FIG. 1(1) illustrates multivalue image data of picture elements of an input image.

In FIG. 1(1), f(i, j) represents multivalue density data of an input picture element at the position of a target picture element to be binary-coded. Picture elements above the broken line have already been subjected to binary-coding processing. After binary-coding of the target picture element, the same binary-coding processing is sequentially performed for f(i+1, j), f(i+2, j), . .

FIG. 1(2) illustrates binary-coded image data. In FIG. 1(2), B(i, j) represents the density (having a value of 0 or 1) of the target picture element after binary-coding processing. Data within the portion surrounded by the broken line are image data which have already been subjected to binary-coding processing before the target picture element is processed. These data are used in binary-coding processing of the target picture element.

FIG. 1(3) illustrates a weighting mask. In FIG. 1(3), the respective R's represent weighting-mask components for obtaining an average density, and constitutes a 5×3-size matrix. In this case, the weights for the picture elements not yet subjected to binary-coding processing are R(0, 0)=R(1, 0)=R(2, 0)=0.

In the present method, when it is intended to perform binary-coding processing of input multivalue data f(i, j) (0–63), a weighted average value m(i, j) is obtained from the binary data B(i, j) within the portion surrounded by the broken line shown in FIG. 1(2) and the previously-provided weighting-mask component R(x, y) shown in FIG. 1(3), and binary-coding processing is performed using the average value m(i, j) as a threshold value. The density is preserved by correcting adjacent input multivalue data to be subsequently binary-coded using a difference value, the value of the difference between the average value m(i, j) and the input multivalue data f(i, j).

In the example shown in FIGS. 1(1)–1(3), $$m(i,j) = \sum_{y=-2}^{0} \sum_{x=-2}^{2} R(x, y) \cdot B(i + x, i + y). \quad (1)$$

$$\begin{aligned} &B(i,j) = 1 \text{ when } f(i,j) + E(i,j) > m(i,j) \\ &B(i,j) = 0 \text{ when } f(i,j) + E(i,j) \leq m(i,j). \\ &E_1(i+1,j) = \tfrac{1}{2}\{f(i,j) + E(i,j) - m(i,j)\} \\ &\quad = E_2(i+j+1) \\ &E_0(i,j) = E_1(i+1,j) + E_2(i,j+1), \\ &\text{where} \\ &E(i,j) + E_1(i,j) + E_2(i,j). \end{aligned} \quad (2)$$

Figure 2:
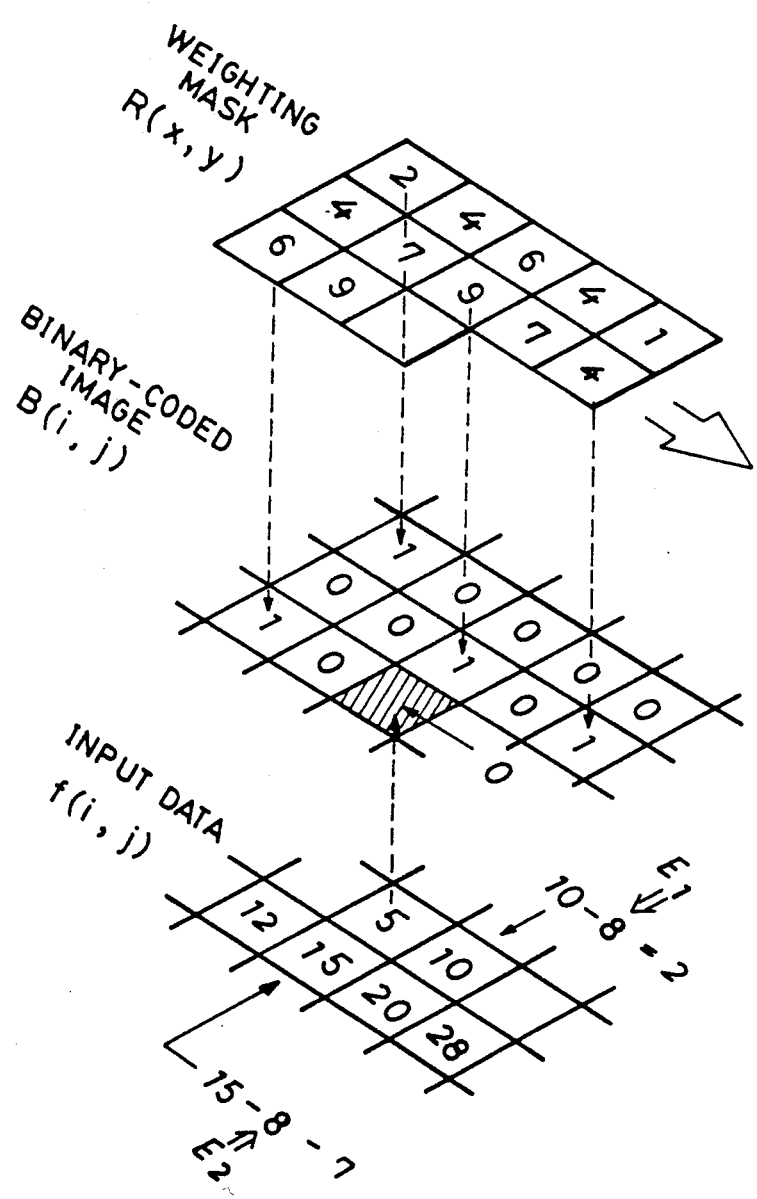
FIG. 2 illustrates an example of image data in a first embodiment of the present invention.

The above-described principle will now be more specifically explained according to the contents of FIG. 2.

As shown in the upper portion of FIG. 2, a weighting mask used in the present embodiment is set so that the sum of its components is 63 for the 12 picture elements near the target picture element which are in the mask. Accordingly, m(i, j) can be used as is for binary-coding processing as a threshold value for values between 0–63.

The threshold value m(i, j) for performing binary-coding processing of multivalue data "5", for example, of a target picture element shown in FIG. 2 can be obtained using binary data B(i, j) illustrated in the middle portion of FIG. 2 as m(i, j)=9×0+6×1+(4×0+7×0+9×1+7×0+4×-1)+(1×0+4×0+6×0+4×0+2×1)=21.

Hence, B(i, j) is binary-coded as "0", the binarization error is 5−21=−16, and $E_1(i+j, j)=E_2(i, j+1)=-8$. By diffusion of this error, f(i+1, j) is corrected from 10 to 10−8=2, and f(i, j+1) is corrected from 15 to 15−8=7.

Figure 3:
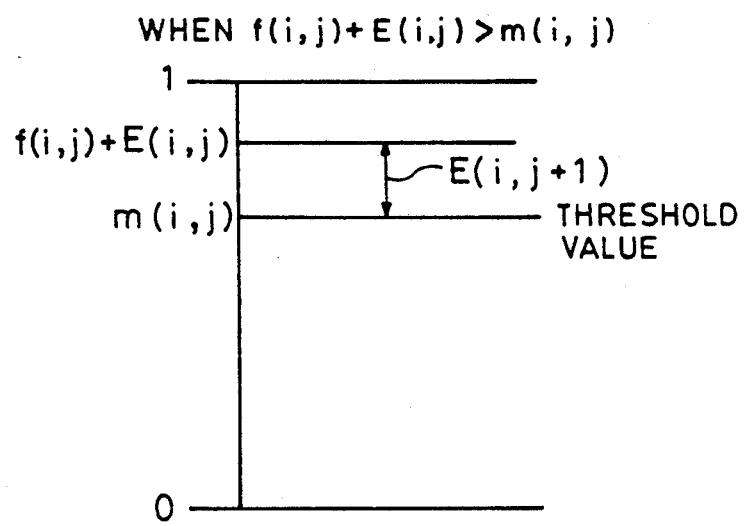
FIGS. 3(1) and 3(2) illustrate a principle of binary-coding processing in the first embodiment.
Figure 3:
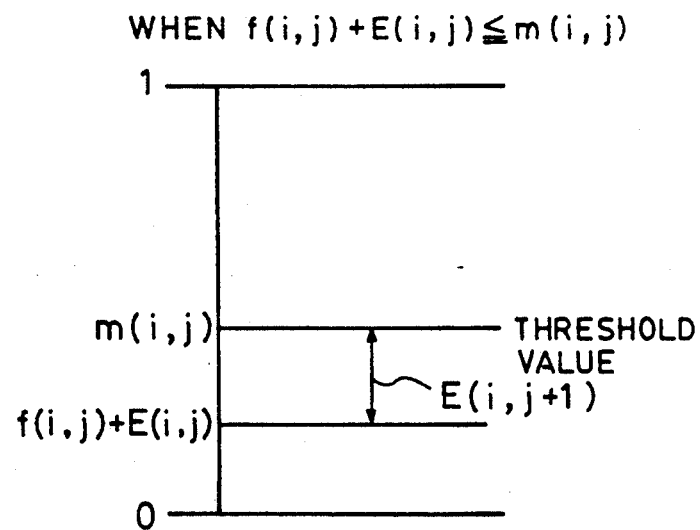

FIGS. 3(1) and 3(2) illustrate expression (2) in diagrams.

In expression (2), E(i, j) is an error obtained by adding ½ of an error produced when a picture element (i−1,j) immediately preceding the target picture element (i, j) is binary-coded and ½ of an error produced when a picture element (i, j−1) on the immediately preceding line is binary-coded.

By binary-coding processing the corrected value obtained by adding the binary-coded error E(i, j) to the target picture element f(i, j), the average density over the entire input image is obtained. Hence, it is possible to preserve completely the image density after binary-coding processing.

By performing such processing which takes binary-coded errors into consideration, halftone-reproducing capability is greatly improved compared with the above-described average density approximation method.

In the foregoing explanation, $E_0(i, j)$ represents an error produced when binary-coding processing is performed for the target picture element $(i, j)$, and $E_1(i+1, j)$ represents an error allocated to picture element $f(i, j+1)$ immediately after the target picture element $(i, j)$, $E_2(i, j+1)$ represents an error allocated to picture element $f(i, j+1)$ on the line immediately succeeding the target picture element $(i, j)$.

In the present embodiment, it is assumed that:

$$E_0(i, j) = 0, \text{ when } |f(i, j) + E(i, j) - m(i, j)| > \alpha \text{ ($\alpha$ is a constant)} \quad (3)$$

where $E_0(i, j)$ is an error to be distributed to adjacent picture elements, and $$E_0(i, j) = f(i, j) + E(i, j) - m(i, j) \quad (4)$$

for other cases.

Accordingly, as indicated by the above-described expressions (3) and (4), in the comparison of the average density m at binary-coding processing with the corrected density of the target picture element, if the corrected density of the target picture element is within a predetermined range such that the density has a value close to the average density m (if the error between the average density m and the corrected density of the target picture element is within the predetermined range), the difference $E_0$ between the corrected density of the target picture element and the average density is allocated as a correction value when the next picture element and a picture element on the immediately succeeding line are subjected to binary-coding processing according to expression (4) ($E_1$ and $E_2$). On the other hand, if the corrected density of the target picture element is out of the predetermined range, that is, if the error between the corrected density of the target picture element and the average density is sufficiently large, the next picture element and a picture element on the immediately succeeding line are not corrected at binary-coding processing, making the correction value 0. That is, error correction is performed if a change in the density of the image near the target picture element is small and the region near the target picture element can therefore be determined as a halftone image region. As a result, a gradual change in the density of the image can be faithfully subjected to pseudo-halftone processing by correcting for a difference with the average density produced by performing binary-coding processing in adjacent picture elements. That is, gradation can be improved. On the other hand, error correction is not performed if the density of the target picture element is determined to change abruptly from the densities of neighboring picture elements, as in edge portions in characters, line drawings or the like, the correction value for the neighboring picture elements is set to 0, and binary-coding processing is performed while suppressing a decrease in resolution caused by preserving the density. It is thereby possible to improve resolution at edge portions.

As described above, in the method of the present embodiment, processing is performed in accordance with a change in the density of the image. That is, the density of a halftone image region is preserved on a binary-coded image using binary-coded errors. The density of a high resolution image region, such as a character region or the like, is not subjected to correction using binary-coded errors in order to prevent a decrease in resolution of the image caused by preserving the density, but is approximated to the average density m.

Figure 4:
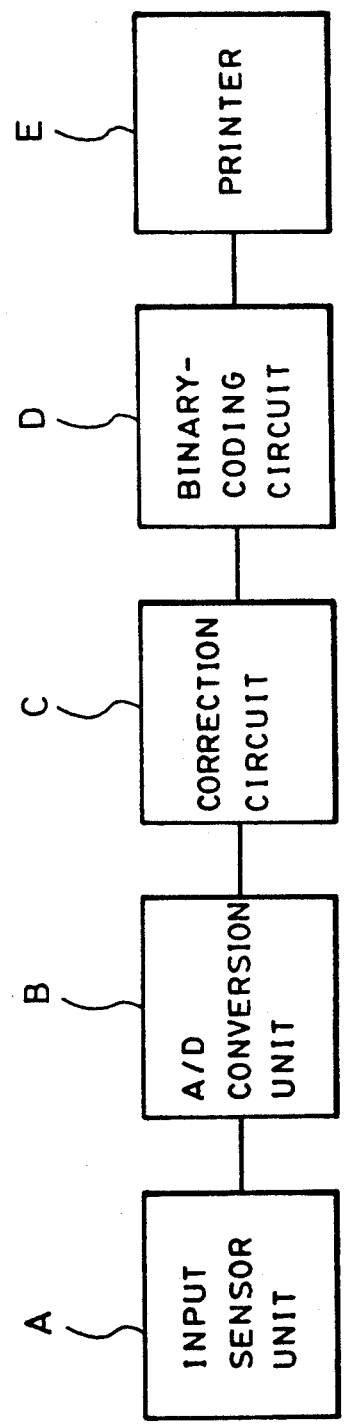
FIG. 4 is a block diagram showing the configuration of an image processing apparatus of the first embodiment.

FIG. 4 is a block diagram of an image processing apparatus according to the present embodiment. In FIG. 4., an input sensor unit A comprises a photoelectric conversion device, such as a CCD (charge-coupled device), and a driving unit for scanning the device, and performs reading scanning of an original. Image data of the original read by the input sensor unit A are sequentially transmitted to an A/D conversion unit B, which converts data of respective picture elements into 6-bit digital data, and so quantizes the data into data having 64 gradation levels. Subsequently, a correction circuit C performs digital calculation processing, such as shading correction for correcting uneven sensitivity of the CCD sensor and uneven illuminance due to an illuminating light source, or the like. Data after the correction processing are transmitted to a binary-coding circuit D. The binary-coding circuit D quantizes the input 6-bit multivalue image data into 1-bit (binary) data according to the above-described method. A printer E comprises a suitable printer, e.g., a laser-beam printer or an ink-jet printer, and reproduces the image of the original on recording paper by performing on-off control of dots in accordance with the binary data transmitted from the binary-coding circuit D.

Figure 5:
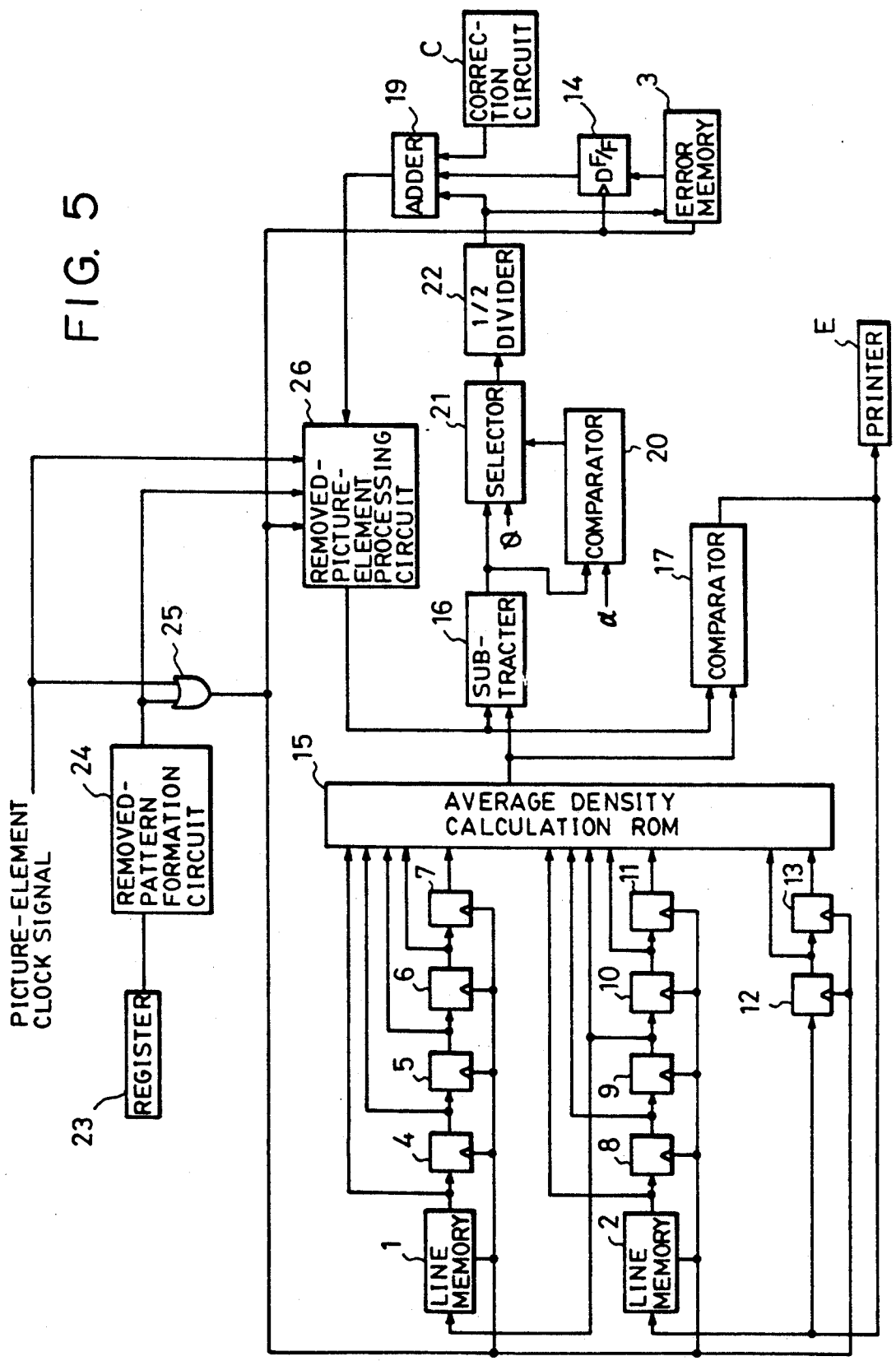
FIG. 5 is a block diagram showing the details of the binary-coding circuit shown in FIG. 4.

FIG. 5 is a block diagram showing the details of the binary-coding circuit D shown in FIG. 4.

In FIG. 5, each of line memories 1 and 2 stores binary data for one line to be subjected to binary-coding processing. An error memory 3 stores error data for one line output from a divider 22. Each of D F/Fs 4–14 delays data by one picture element.

An average density calculation ROM 15 calculates an average density of a predetermined region from binary data around a target picture element, and outputs a threshold value when the data of the target picture element is subjected to binary-coding processing. A subtracter 16 calculates a difference between the input multivalue data of the target picture element and the threshold value output from the ROM 15. A comparator 17 compares the threshold value output from the ROM 15 with the multivalue data of the target picture element. An adder 19 for error correction adds error data output from the divider 22 (the error distributed from the immediately preceding picture element), error data output from the D F/F 14 (the error distributed from a picture element on the immediately preceding line), and 6-bit multivalue input data transmitted from the correction circuit C. A comparator 20 compares error data to be distributed to adjacent picture elements transmitted from the subtracter 16 with a predetermined value $\alpha$. The divider 22 divides the error data to be distributed to adjacent picture elements transmitted from the subtracter 16 to ¼. A selector 21 selects either 0 or the output from the subtracter 16 in accordance with a select signal from the comparator 20. A register 23 sets a reduction ratio. A removed-pattern formation circuit 24 comprising a ROM outputs patterns to be removed in accordance with reduction ratio set in the register 23. A gate 25 outputs a removal clock signal by providing a logical sum of the output of the ROM 24 and a picture-element clock signal. When some of corrected target-picture-element data transmitted from the adder 19 are removed for the purpose of reduction, a removed-picture-element processing circuit 26 obtains the average of the removed picture-element data and data of the immediately preceding picture element, and outputs the average value as the corrected target-picture-element data.

In the above-described configuration, the comparator 17 outputs 1-bit data B(i, j) binary-coded according to expression (2).

The binary-coded data are input to the line memory 2 and the D F/F 12. At that time, the D F/F 12, the line memory 2 and the line memory 1 output binary data B(i−1, j) of the immediately preceding picture element, B(i+2, j−1) and B(i+2, j−2) to the ROM 15, respectively. The D F/Fs 4–11 and 13 also output shifted binary data.

These binary data are binary-coded image data within the region shown in FIG. 1(2). If these data are connected to input addresses of the ROM 15, a binary-coded threshold value can be obtained at high speed, since binary-coded threshold values m(i, j) expressed by expression (2) have been stored in advance based on expression (1).

This threshold value is input to the subtracter 16 and the comparator 17. The value f(i, j)+E(i, j) is also input from the removed-picture element processing circuit 26 to the subtracter 16 and the comparator 17.

Based on the two inputs, the subtracter 16 calculates the difference between the two sides of the inequality in expression (2).

$$E_0(i, j) = f(i, j) + E(i, j) - m(i, j) \tag{5}$$

On the other hand, the comparator compares f(i, j)+E(i, j) with m(i, j) based on the above-described two inputs, and outputs binary-coded data B(i, j). The error $E_0(i,j)$ output from the subtracter 16 based on expression (5) is input to the selector 21 and the comparator 20.

The comparator 20 compares the error $E_0(i, j)$ with the constant $\alpha$ using expression (3), and outputs a select signal to the selector 21 based on the result of the comparison.

In accordance with the select signal transmitted from the comparator 20, the selector 21 selectively outputs $E_0(i,j)=0$ if the absolute value of the error $E_0(i, j)$ is greater than $\alpha$, and the output of the subtracter 16 as it is if the absolute value of the error $E_0(i, j)$ is equal to or smaller than $\alpha$.

The error $E_0$ output from the selector 21 is divided by ½ by the divider 22, and is distributed to $E_1(i+1, j)$ and $E_2(i, j+1)$.

$E_1(i+1, j)$ is input to the adder 19, and is added to input image data f(i+1, j) of the next picture element.

$E_2(i, j+1)$ is input to the error memory 3, and is added to input image data f(i, j+1) of a picture element on the immediately succeeding line by the adder 19 after passing through the D F/F 14.

The removed-picture-element processing circuit 26 delays the added value by one picture-element clock pulse when the image is not reduced.

Binary-coding processing is sequentially performed by repeating the above-described processing every time image data are input. An explanation will now be provided of reduction of an image.

The register 23 is connected to a CPU bus, and a reduction ratio is set in the register 23. The removed pattern formation circuit 24 outputs patterns indicating which data are to be removed, based on the set reduction ratio. The output of the pattern of data to be removed gates a picture-element clock signal in the gate 25. The output of the gate 25 is connected to the line memories 1 and 2, the error memory 3, the D F/Fs 4–14 and the removed-picture-element processing circuit 26. For example, if the reduction ration is 100%, the output of the circuit 24 is "L", and the gate 25 outputs the picture-element clock signal as it is. If the reduction ratio is 50%, circuit 24 outputs a square wave wherein "H" and "L" are repeated in synchronization with picture-element clock pulses. Hence, the output of the gate 25 has a waveform wherein a clock pulse is removed for every two picture elements. The line memories 1 and 2, the error memory 3, the D F/Fs 4–14 and the removed-picture-element processing circuit 26 thereby operate only for one picture element in every two picture elements. Thus, picture elements are partially removed (reduced).

Figure 6:
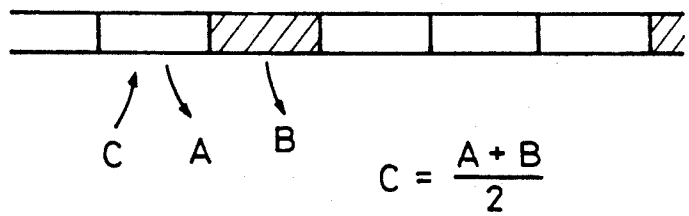
FIGS. 6(1) and 6(2) illustrate the schematic operations of the removed-picture-element processing circuit shown in FIG. 5.
Figure 6:
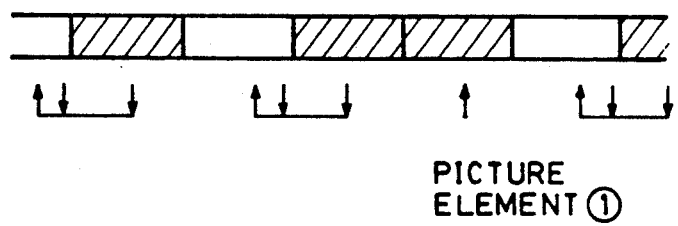

FIGS. 6(1) and 6(2) illustrate the schematic operations of the removed-picture-element processing circuit 26.

FIG. 6(1) represents a case wherein the reduction ratio is greater than 50%. It is assumed that B is a picture element to be removed. An average value C of the input multivalue data of the picture element B and the input multivalue data of a picture element A immediately before the picture element B which is not to be removed is obtained. The value C is used as the input multivalue data for the picture element A.

FIG. 6(2) represents a case wherein the reduction ratio is smaller than 50%. In this case, there is a possibility that two or more consecutive picture elements may have to be removed. In such case, the above-described processing is performed only for the leading picture element among a set of consecutive picture elements to be removed, and other picture elements (the picture element 1 in the case of FIG. 6(2)) are simply removed.

As described above, in reduction, by not rejecting input multivalue data of a picture element to be removed, but by modifying adjacent picture elements to reflect that data, it is possible to prevent discontinuity of gradation and disappearance of fine lines. This approach is particularly effective when binary data after binary-coding processing are used for the subsequent binary-coding processing, as in the present embodiment.

Figure 7:
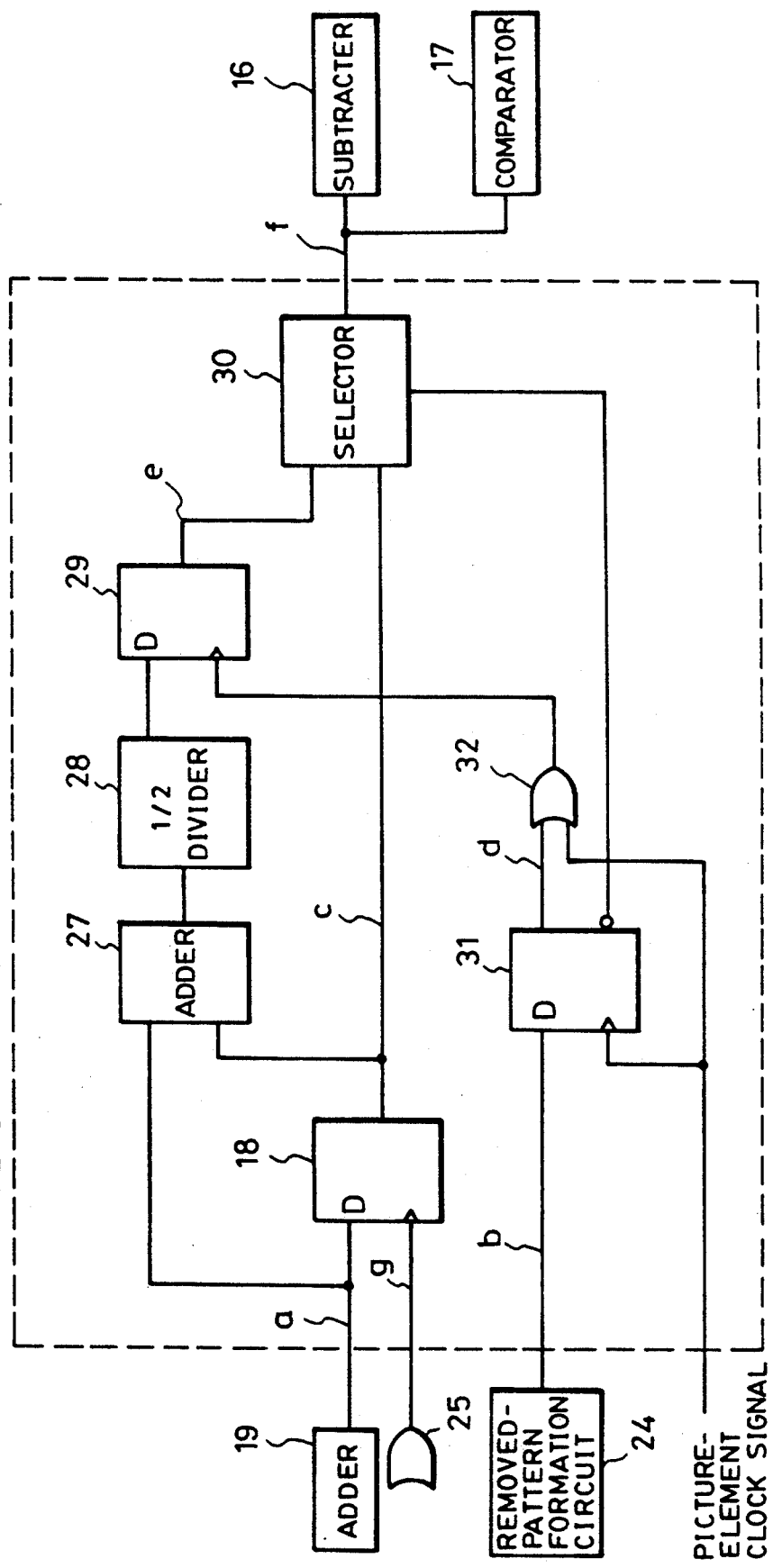
FIG. 7 illustrates the details of the removed-picture-element processing circuit of the first embodiment.

FIG. 7 illustrates the detail of the removed-picture-element processing circuit 26. In FIG. 7, there are shown D F/Fs 18, 29 and 31. An adder 27 adds input multivalue data (corrected target-picture-element data "a") and data c of the immediately preceding picture-element which is not removed. A divider 28 divides the added value by 2 to obtain an average value. A selector 30 selects whether the corrected target-picture-element data c is output, or an average value c with the removed picture element is output. Also shown are a removed-pattern signal b, an a signal d obtained by delaying the signal b by an amount of one picture element.

Figure 8:
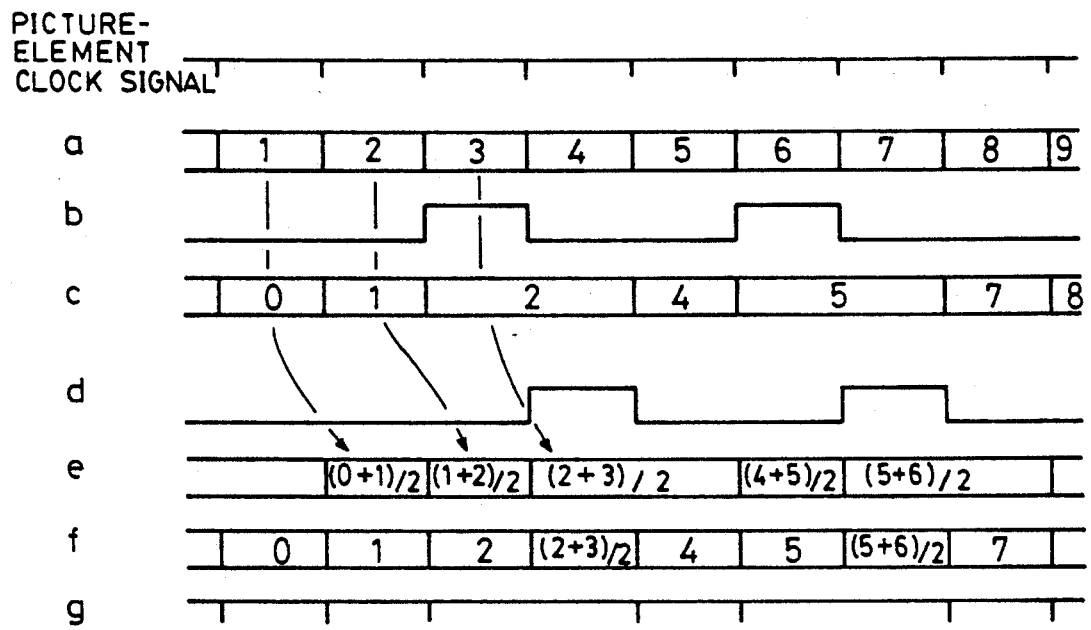
FIGS. 8(1) and 8(2) are operational timing charts of the removed-picture-element processing circuit of the first embodiment.
Figure 8:
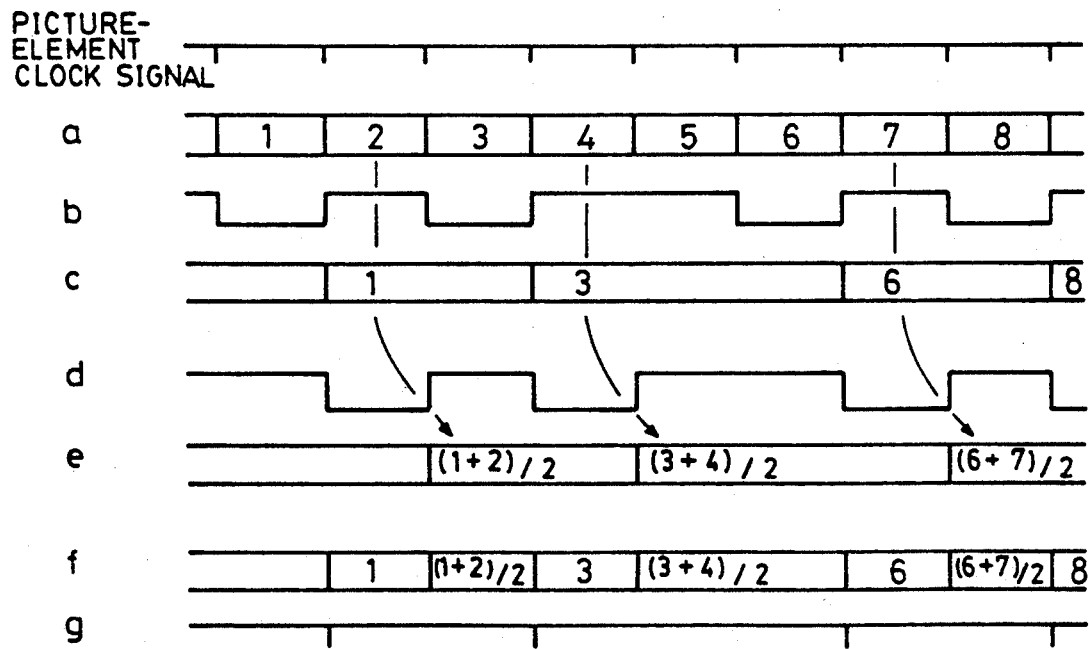

FIGS. 8(1) and 8(2) are operational timing charts for the removed-picture-element processing circuit 26.

The corrected target-picture-element data a are latched with removal clock pulses g to provide signal c. In this case, the third and the sixth components of the corrected target-picture-element data a are removed.

Signals a and c are input to the adder 27, pass through the divider 28, and the average (signal e) of signals a and c is latched by the D F/F 29. The latch timing is provided by an OR signal of signal d obtained by delaying removed-pattern signal b by one picture element and a picture-element clock signal.

Signals e and c are input to the selector 30, whose output is selected by an inverted signal, formed by inverting signal d.

Accordingly, in the present case, components 3 and 6 are removed from among components 1, 2, 3, 4, 5, 6 and 7 of the input corrected target-picture-element data, and the output signal (f) of the removed-picture-element processing circuit 26 assumes values 1, (2+3)/2, 4, (5+6)/2 and 7.

As explained above, according to the present embodiment, the average density is calculated using only binary data after binary-coding processing has been completed, and binary-coding processing of input multi-value data is performed using the average density as the threshold value. Hence, it is possible to reduce the amount of processing for binary-coding from what is needed in the average density approximation method. Furthermore, since input multivalue data are subjected to error correction if an error between the input multi-value data and the average density produced when the data are subjected to binary-coding processing is within a predetermined range, it is possible to improve greatly gradation.

In the present embodiment, if an error between the average density and the input multivalue data is greater than a predetermined value, the error is not corrected. Hence, it is possible to prevent a decrease in resolution caused by preserving the density, and to reproduce edge portions clearly. Furthermore, since reduction is performed by controlling clock signals for the line memories 1 and 2, the error memory 3, the D F/Fs 4–13 and the reduced-picture-element processing circuit 26, the configuration of hardware is greatly simplified, and, after all, binary-coding processing is performed after removing some of input image data. Moreover, by performing binary-coding processing while reflecting a removed picture element upon adjacent picture elements, it is possible to prevent deterioration of gradation and resolution due to reduction. Deterioration of picture quality can be prevented also when binary-coded data are used in binary-coding processing for picture elements after a target picture element.

Second Embodiment

In a second embodiment of the present invention, the removed-picture-element processing circuit 26 of the first embodiment is partly modified.

Figure 9:
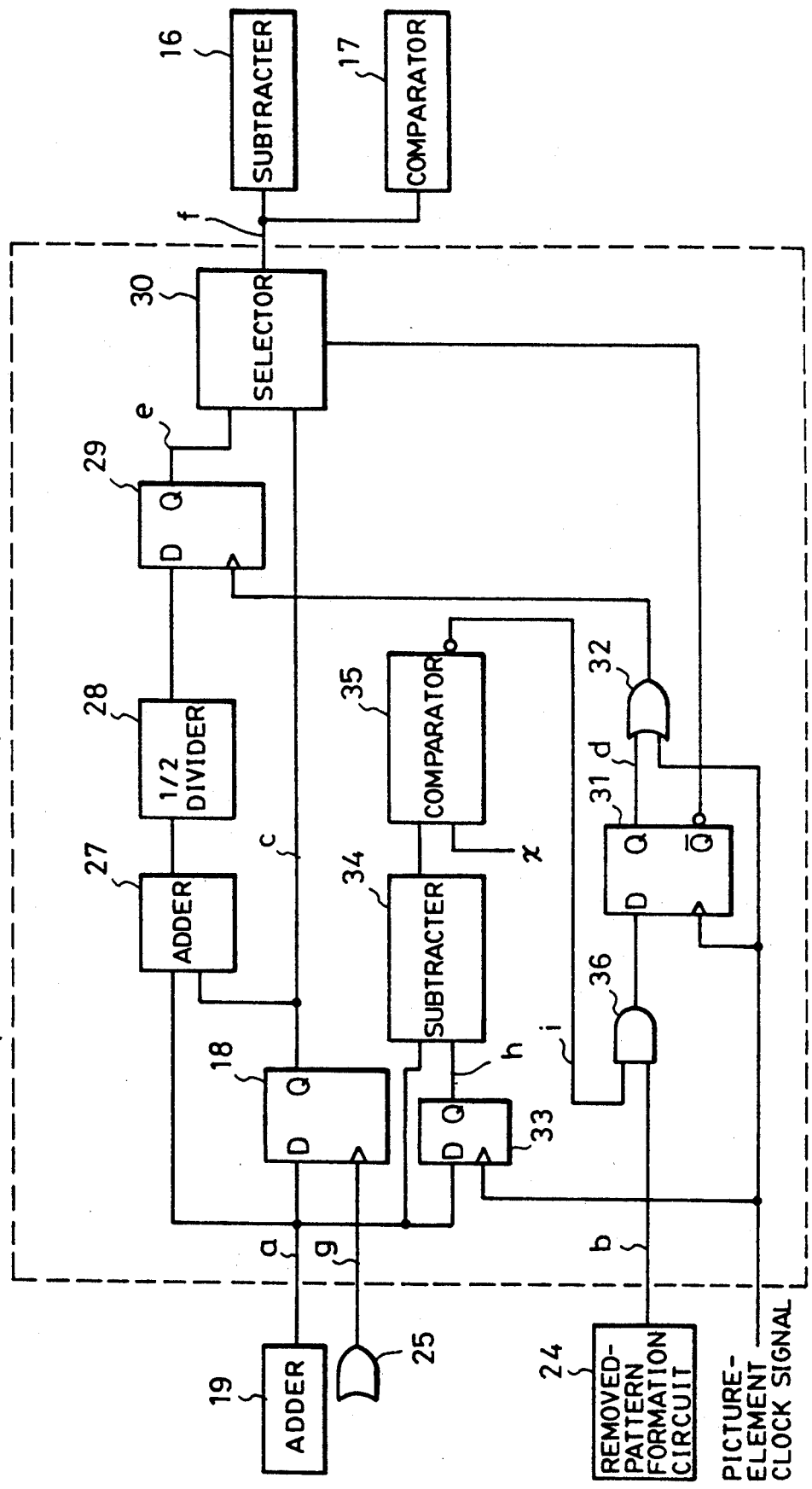
FIG. 9 illustrates the details of a removed-picture element processing circuit of a second embodiment of the present invention.

FIG. 9 illustrates the details of the removed-picture-element processing circuit 26 of the second embodiment. In FIG. 9, there are shown D F/Fs 18, 29, 31 and 33. An adder 27 adds input multivalue data (corrected target-picture-element data a) and data c of the preceding picture element which is not to be removed. A divider 28 divides the added value by 2, and obtains the average value of data a and c. A selector 30 selects whether the preceding-picture-element data c are to be output, or an average value e (the average of a and c) is to be output. A subtracter 34 obtains a difference between the corrected target-picture-element data a and preceding-picture-element data h. A comparator 35 compares the difference between the values a and c with a certain fixed value x (or a value set by a CPU or the like). b represents a removed-pattern signal. An AND gate 36 gates the removed-pattern signal with the output of the comparator 35. d represents a signal obtained by delaying the signal b by one picture element. There is also shown an OR gate 32, whose function is explained below.

Figure 10:
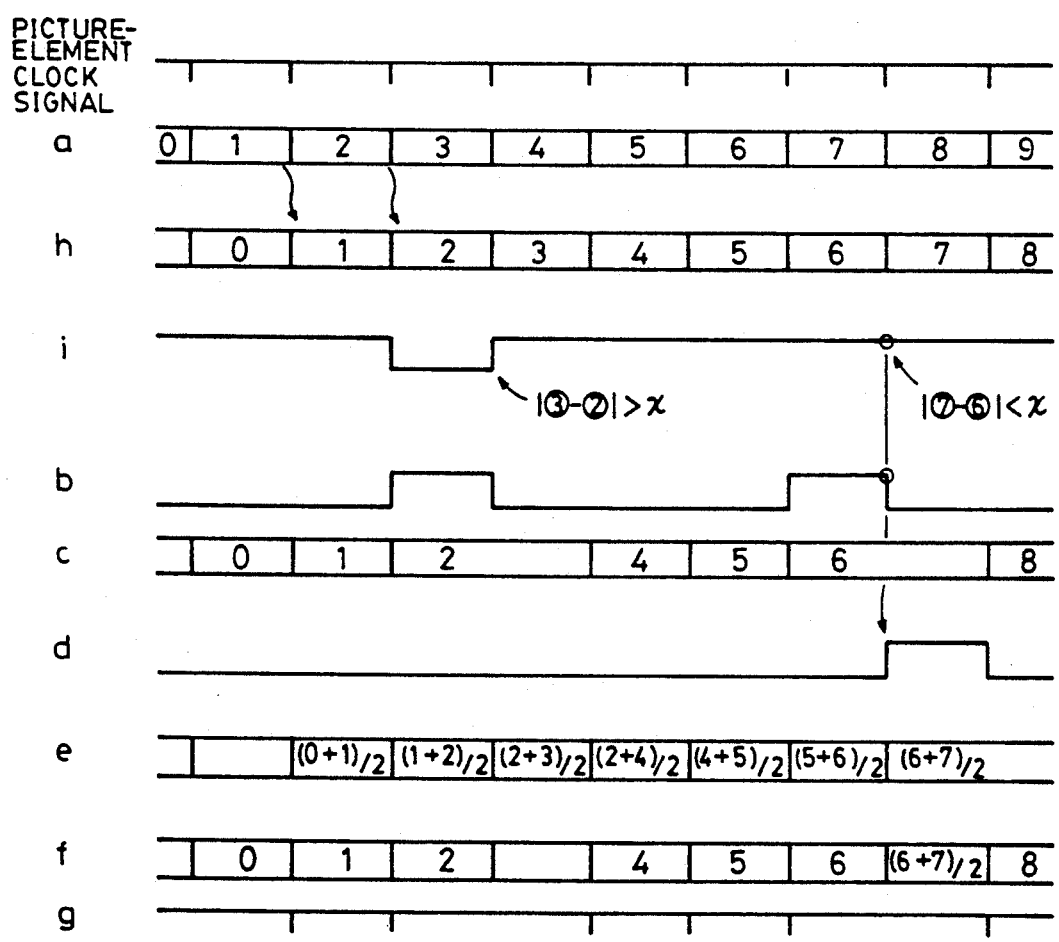
FIG. 10 is an operational timing chart of the removed-picture-element processing circuit of the second embodiment.

FIG. 10 is an operational timing chart of the removed-picture-element processing circuit 26 of the second embodiment.

The corrected target-picture-element data a are latched by the D F/F 33 with picture-element clock pulses, and the signal h is obtained. That is, signal b comprises data of the immediately preceding picture element as compared with the corrected target-picture-element data a. When it is determined by the subtracter 34 and the comparator 35 that $|a=h|>x$, signal i becomes "L". In FIG. 10, the difference between the third and second picture elements of the signal a is greater than x; that is, an edge portion, such as a character portion or the like, is present in the image.

Picture elements corresponding to portions where the removed-pattern signal b is "H" must be removed.

The corrected target-picture-element data a are latched by another D F/F 18 with timing determined by a removal clock signal g, and signal c is obtained. In this case, the third and seventh picture elements are removed.

The signals a and c are input to the adder 27 and pass through the divider 28, and the average of the signals a and c is latched by the D F/F 29 (signal e). The latch timing is obtained from a signal which is gotten by ORing (1) a signal d obtained by delaying the result of ANDing signals i (obtained by removing a removed portion at an edge portion from a removed portion) and b, by one picture element, and (2) the picture-element clock signal.

The signals e and c are input to the selector 30, which selects its output in accordance with an inverted signal, obtained by inverting signal d.

Accordingly, in the present embodiment, components 3 and 7 are removed from among components 0, 1, 2, 3, 4, 5, 6, 7 and 8 of the input corrected target-picture-element data. The second picture element which corresponds to an edge portion is output as it is, and the average value of the sixth and seventh picture elements which do not correspond to a non-edge portion is output.

As explained above, according to the second embodiment, in reduction, it is possible to prevent deterioration of resolution at an edge portion by performing simple partial removal of the edge portion, and to prevent deterioration of gradation at a non-edge portion by modifying picture elements preceding a removed picture element to reflect data of the removed picture element.

Third Embodiment

An explanation will now be provided of a third embodiment of the present invention wherein the binary-coding circuit shown in FIG. 5 is partly modified. In the third embodiment, when the reduction ratio is greater than a predetermined value (i.e., is close to unit magnification), information of a picture element assigned by the removed-pattern formation circuit 24 is simply removed.

Figure 11:
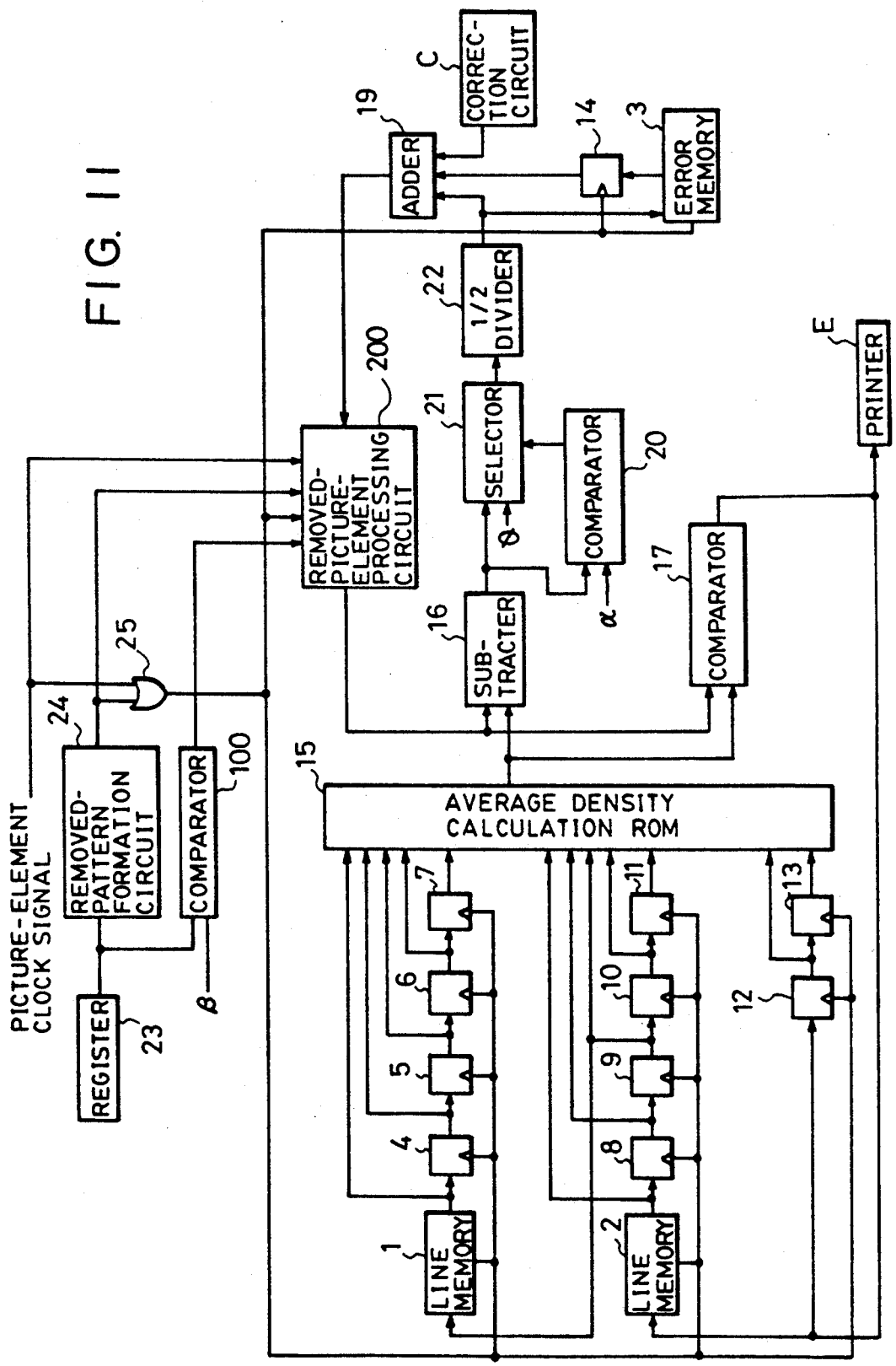
FIG. 11 is a block diagram showing the details of a binary-coding circuit of a third embodiment of the present invention.

FIG. 11 is a block diagram showing the detail of the binary-coding circuit D in the third embodiment. In FIG. 11, like components to those in FIG. 5 are indicated by the same numerals, and detailed explanation of the binary-coding circuit will be omitted.

Reduction of an image in the third embodiment will now be explained.

The register 23 is connected to a CPU bus, and a reduction ratio is set in the register 23. The removed pattern formation circuit 24 outputs patterns to be removed based on the set reduction ratio. The output of a pattern to be removed gates a picture-element clock signal in the gate 25. The output of the gate 25 is connected to the line memories 1 and 2, the error memory 3, the D F/Fs 4-14 and a removed-picture-element processing circuit 200. For example, if the reduction ratio is 100%, the output of the circuit 24 is "L", and the gate 25 outputs the picture-element clock signal as it is. If the reduction ratio is 50%, a square wave wherein "H" and "L" are repeated in synchronization with picture-element clock pulses. Hence, the output of the gate 25 has a waveform wherein a clock pulse is removed for every two picture elements. The line memories 1 and 2, the error memory 3, the D F/Fs 4-14 and the removed-picture-element processing circuit 200 thereby operate only for one picture element in every two picture elements. Thus, picture elements are partially removed (reduced).

The reduction ratio set in the register 23 is input to a comparator 100, and is compared with a constant value $\beta$.

If the value of the reduction ratio is greater than $\beta$ (which is close to unit magnification), the comparator 100 outputs "H" so that an average value is not output from the removed-picture-element processing circuit 200. If the value of the reduction ratio is smaller than $\beta$, the comparator 100 outputs "L" so as to enable the operation of the removed-picture-element processing circuit 200.

It is thereby possible to prevent the phenomena that fine lines are apt to disappear and gradation is apt to be deteriorated as the reduction ratio is reduced, by enabling the removed-picture-element processing circuit 200 and reflecting data of a removed picture element upon adjacent picture elements.

It is also possible to prevent deterioration of resolution caused by performing removed-picture-element processing when the reduction ratio is high.

The schematic operations of the removed-picture-element processing circuit 200 are almost the same as those shown in FIG. 6.

FIG. 6(1) represents a case wherein the reduction ratio is greater than 50%. It is assumed that B is a picture element to be removed. An average C of the input multivalue data of the picture element B and the input multivalue data of a picture element A immediately before the picture element B which is not to be removed is obtained. The value C is used as input multivalue data for the picture element A. When the reduction ratio is greater than the above-described value $\beta$, the signal from the comparator 100 is "H". Hence, data of the picture element B are simply removed, and data of the picture element A are not replaced by the average value C.

FIG. 6(2) represents a case wherein the reduction ratio is smaller than 50%. In this case, there is a possibility that two or more consecutive picture elements may have to be removed. At that time, the above-described processing is performed only for the leading picture element among the consecutive picture elements to be removed, and other picture elements (the picture element 1 in the case of FIG. 6(2)) are simply removed.

As described above, in reduction, by not rejecting input multivalue data of a picture element to be removed, but by modifying adjacent picture elements to reflect that data, it is possible to prevent discontinuity of gradation and disappearance of fine lines. This approach is particularly effective when binary data after binary-coding processing are used for the subsequent binary-coding processing, as in the present embodiment.

Figure 12:
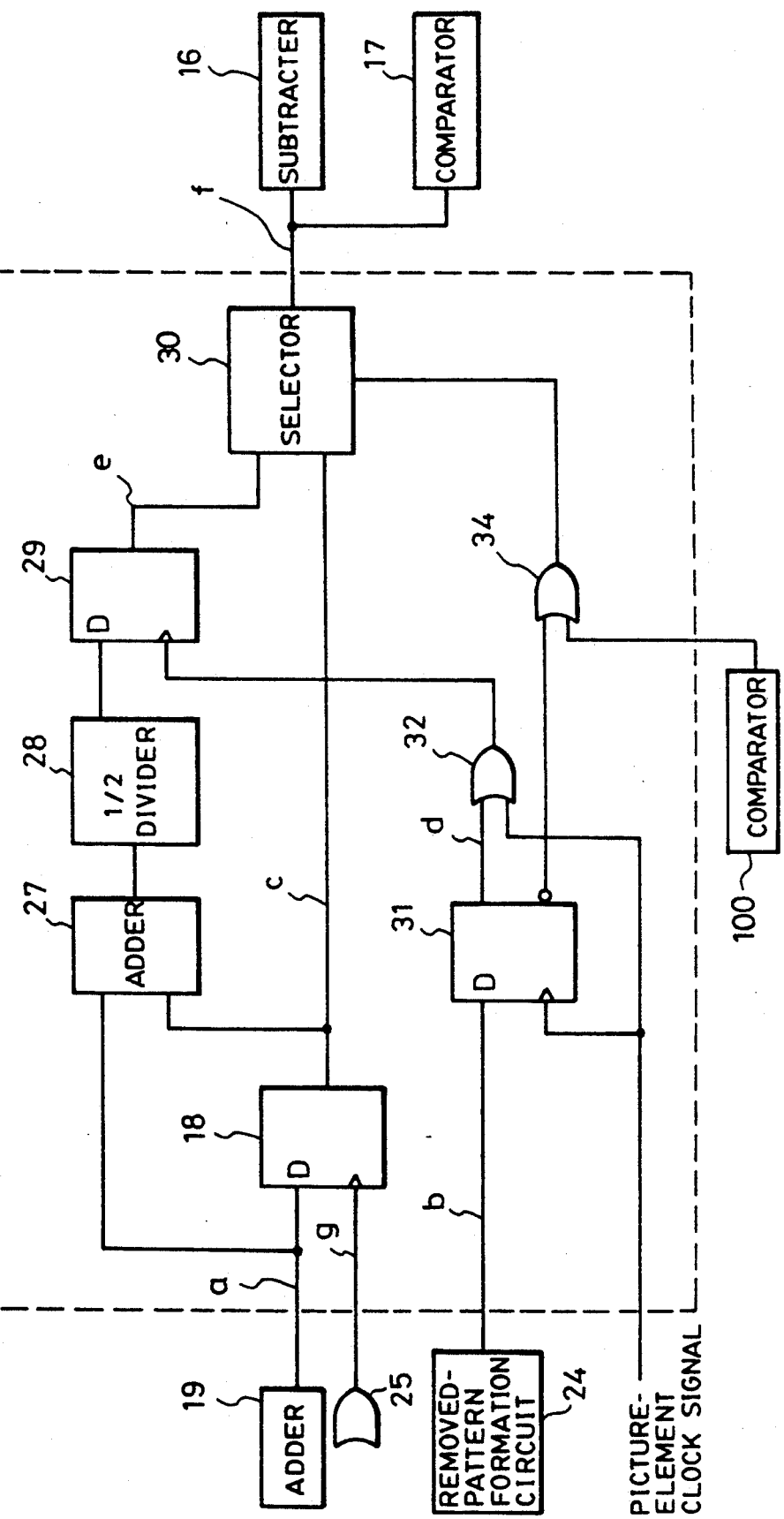
FIG. 12 illustrates the detail of a removed-picture-element processing circuit of the third embodiment.

FIG. 12 illustrates the detail of the removed-picture-element processing circuit 200. In FIG. 12, like components to those in FIG. 7 are indicated by the same numerals. In FIG. 12, there are shown D F/Fs 18, 29 and 31. An adder 27 adds input multivalue data (corrected target-picture-element data a) and data c of the immediately preceding picture-element which is not removed. A divider 28 divides the added value by 2 to obtain an average value. A selector 30 selects whether the corrected target-picture-element data c is output, or an average value e with the removed picture element is output. Also shown are a removed-pattern signal b, and a signal d obtained by delaying the signal b by one picture element.

When the output of the comparator 33 is "H", the signal c is always selected, and simple removal is performed. When the output of the comparator 33 is "L", switching between the signals c and e is performed, the removed-picture-element processing is performed.

As explained above, according to the present embodiment, the average density is calculated using only binary data after binary-coding processing has been completed, and binary-coding processing of input multivalue data is performed with making the average density a threshold value. Hence, it is possible to reduce the amount of processing for binary-coding than in the average density approximation method. Furthermore, since input multivalue data are subjected to error correction if an error between the input multivalue data and the average density produced when the data are subjected to binary-coding processing is within a predetermined range, it is possible to improve gradation greatly.

In the present embodiment, if an error between the average density and the input multivalue data is greater than a predetermined value, the error is not corrected. Hence, it is possible to prevent a decrease in resolution caused by preserving the density, and to reproduce edge portions clearly.

Furthermore, since reduction is performed by controlling clock signals for the line memories 1 and 2, the error memory 3, the D F/Fs 4-13 and the reduced-picture-element processing circuit 26, the configuration of hardware is greatly simplified, and, after all, binary-coding processing is performed after removing some of input image data. Moreover, when the reduction ratio is small, by performing binary-coding processing while modifying picture elements adjacent to a removed one to reflect the removed picture element, it is possible to prevent deterioration of gradation and resolution due to reduction. Deterioration of picture quality can be prevented also when binary-coded data are used in binary-coding processing for picture elements after a target picture element.

Although, in the above-described embodiment, the determination whether the removed-picture-element processing operation must be enabled or disabled is performed by comparing the reduction ratio with the fixed value $\beta$, a resister may be provided so that the value $\beta$ is variably set under the control of a CPU. Alternatively, the comparator 33 may be removed, and a resister for selecting enable/disable processing may be provided to control the operation.

As explained above, according to the present invention, it is possible to obtain an image having excellent gradation and resolution in a short time with a simple configuration of hardware, and to obtain an image not having deterioration of picture quality even in reduction.

While the present invention has been described with respect to what are presently considered to be the preferred embodiments, it is to be understood that the invention is not limited to the disclosed embodiments. The present invention is intended to cover various modifications and equivalent arrangements included within the spirit and scope of the appended claims.

What is claimed is:

1. An image processing apparatus comprising:
   input means for inputting multivalue data;
   calculation means for obtaining an average density value representing average in a predetermined set of picture elements neighboring a target picture element, using data which have been subjected to quantization processing;
   quantization means for quantizing the input multivalue data according to the average density value obtained by said calculation means; and
   processing means for performing removal processing on multivalue data of a predetermined picture element from among input multivalue data of a plurality of picture elements,
   wherein said quantization means quantizes multivalue data which are obtained from multivalue data of the removed picture element and from multivalue data of picture elements which are not removed.

2. An image processing apparatus according to claim 1, wherein said quantization means performs binary-coding processing of the multivalue data input by said input means according to the average density value.

3. An image processing apparatus according to claim 2, wherein said calculation means calculates the average density value using binary data of a predetermined region which has been subjected to binary-coding processing, the predetermined region including the predetermined set of picture elements.

4. An image processing apparatus according to claim 2, further comprising storage means for storing binary data which have been subjected to binary-coding processing by said quantization means.

5. An image processing apparatus according to claim 1, wherein said processing means further comprises means for forming a partially-removed pattern in accordance with an assigned reduction ratio, and performs removal processing of the multivalue data of the predetermined picture element from among the multivalue data of the plurality of picture elements according to said pattern.

6. An image processing apparatus according to claim 2, wherein said quantization means performs binary-coding processing of data which include an average value of the multivalue data of the removed picture element and the multivalue data of picture elements which are not removed.

7. An image processing apparatus according to claim 1, further comprising correction means for correcting an error produced when said quantization means quantizes the multivalue data.

8. An image processing apparatus according to claim 2, further comprising detection means for detecting an edge portion of an image, and wherein said quantization means performs binary-coding processing of multivalue data obtained from the multivalue data of the removed picture element and the multivalue data of picture elements which are not removed for a non-edge portion of an image, and performs binary-coding processing of the picture elements which are not removed for an edge portion of the image.

9. An image processing apparatus comprising:
   input means for inputting multivalue data;
   binary coding means for performing binary-coding processing of the input multivalue data;
   processing means for performing removal processing of multivalue data of a predetermined picture element in accordance with a reduction ratio of an image from among the input multivalue data of a plurality of picture elements; and
   calculation means for calculating an average value of multivalue data of the removed picture element and multivalue data of picture elements which are not removed,
   wherein said binary coding means further comprises selection means for selecting any of (1) the average value and (2) the multivalue data of the picture elements which are not removed, as input data as an object of binary-coding processing in accordance with the reduction ratio of the image.

10. An image processing apparatus according to claim 9, wherein said binary coding means further comprises calculation means for obtaining an average density value of a predetermined region using binary-coded binary data of picture elements neighboring a target picture element, and performs binary-coding processing of multivalue data of the target picture element using the average density value as a threshold value.

11. An image processing apparatus according to claim 10, further comprising correction means for correcting an error produced when said binary coding means performs binary-coding processing of multivalue data.

12. An image processing apparatus comprising:
    input means for inputting multivalue data;
    calculation means for obtaining an average density value of picture elements neighboring a target picture element using data subjected to quantization processing;
    quantization means for quantizing the input multivalue data according to the average density value obtained by said calculation means; and
    processing means for performing removal processing of multivalue data of a predetermined picture element in accordance with an assigned reduction ratio from among input multivalue data of a plurality of picture elements.
    wherein said quantization means quantizes multivalue data of picture elements other than the picture element subjected to the removal processing by said processing means.

13. An image processing apparatus according to claim 12, wherein said quantization means performs binary-coding processing of the multivalue data input by said input means according to the average density value.

14. An image processing apparatus according to claim 13, wherein said calculation means calculates the average density value using binary data of a predetermined region which has been subjected to binary-coding processing.

15. An image processing apparatus according to claim 13, further comprising storage means for storing binary data which has been subjected to binary-coding processing by said quantization means.

16. An image processing apparatus according to claim 12, wherein said processing means further comprises means for forming a partially-removed pattern in accordance with an assigned reduction ratio, and performs removal processing of the multivalue data of the predetermined picture element from among the multivalue data of the plurality of picture elements according to said pattern.

17. An image processing apparatus according to claim 13, wherein said quantization means performs binary-coding processing of data having a value which is an average of the multivalue data of the removed picture element and the multivalue data of picture elements which are not removed.

18. An image processing apparatus according to claim 12, further comprising correction means for correcting an error produced when said quantization means quantizes the multivalue data.

19. An image processing apparatus comprising:
input means for inputting multivalue data which include data for first, second and third picture elements;
processing means for performing removal processing of multivalue data of the second and third picture elements from among the input multivalue data of first, second and third picture elements, said processing means further comprising means for calculating an average value of the multivalue data of the removed second picture element and the multivalue data of the first picture element which is not removed, and for replacing the multivalue data of the first picture element with the average value; and
binary-coding means for performing binary-coding processing using the average value multivalue data as data of the first picture element.

20. An image processing apparatus according to claim 19, wherein said binary coding means further comprises calculation means for obtaining an average density value of a predetermined region using binary-coded binary data of picture elements neighboring a target picture element, and performs binary-coding processing of multivalue data of the target picture element using the average density value as a threshold value.

21. An image processing apparatus according to claim 20, further comprising correction means for correcting an error produced when said binary coding means performs binary-coding processing of multivalue data.

22. An image processing apparatus according to claim 19, further comprising detection means for detecting an edge portion of an image, wherein said binary coding means performs binary-coding processing using the average value multivalue data as the first picture element for a non-edge portion of an image, and performs binary-coding processing of the input multivalue data of the first picture element for an edge portion of the image.

23. An image processing apparatus comprising:
input means for inputting multivalue data which include data for first and second picture elements;
processing means for performing removal processing of multivalue data of the second picture element from among the input multivalue data of the first and second picture elements, said processing means further comprising means for calculating an average value of the multivalue data of the removed second picture element and the multivalue data of the first picture element which is not removed, and for replacing the multivalue data of the first picture element with the average value;
binary-coding means for performing binary-coding processing using the average value multivalue data as data of the first picture element; and
correction means for correcting an error produced when said binary coding means performs binary-coding processing of multivalue data.

24. An image processing apparatus according to claim 23, wherein said binary coding means further comprises calculation means for obtaining an average density value of a predetermined region using binary-coded binary data of picture elements neighboring a target picture element, and performs binary-coding processing of multivalue data of the target picture element using the average density value as a threshold value.

* * * * *

UNITED STATES PATENT AND TRADEMARK OFFICE
CERTIFICATE OF CORRECTION

PATENT NO. : 5,200,839
DATED      : April 6, 1993
INVENTOR(S) : TAKEHARU UCHIZONO It is certified that error appears in the above-identified patent and that said Letters Patent is hereby corrected as shown below:

<u>COLUMN 8</u>

Line 53, "value c" should read --value e--.

Signed and Sealed this

Eighth Day of February, 1994

Attest:

BRUCE LEHMAN

Attesting Officer

Commissioner of Patents and Trademarks